United States Patent
Lee et al.

(10) Patent No.: US 12,218,355 B2
(45) Date of Patent: Feb. 4, 2025

(54) ANODE ACTIVE MATERIAL FOR ALL-SOLID-STATE BATTERY

(71) Applicants: Hyundai Motor Company, Seoul (KR); Kia Corporation, Seoul (KR)

(72) Inventors: Yoon Kwang Lee, Gyeonggi-do (KR); Yun Sung Kim, Seoul (KR); Ga Hyeon Im, Gyeonggi-do (KR); Kyu Joon Lee, Gyeonggi-do (KR); Hong Seok Min, Gyeonggi-Do (KR); Sang Heon Lee, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/664,564

(22) Filed: May 15, 2024

(65) Prior Publication Data

US 2024/0363863 A1 Oct. 31, 2024

Related U.S. Application Data

(63) Continuation of application No. 18/583,306, filed on Feb. 21, 2024.

(30) Foreign Application Priority Data

Apr. 27, 2023 (KR) ........................ 10-2023-0055387

(51) Int. Cl.
*H01M 4/587* (2010.01)
*H01M 4/36* (2006.01)
*H01M 4/38* (2006.01)
*H01M 4/02* (2006.01)

(52) U.S. Cl.
CPC ........... *H01M 4/587* (2013.01); *H01M 4/366* (2013.01); *H01M 4/386* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 9,882,209 B2 | 1/2018 | Lee et al. |
| 2009/0269669 A1 | 10/2009 | Kim et al. |
| 2022/0255055 A1 | 8/2022 | Su et al. |

FOREIGN PATENT DOCUMENTS

| EP | 4 148 827 A1 | 3/2023 |
| JP | 6968929 B2 | 11/2021 |
| KR | 10-2014-0082036 A | 7/2014 |
| KR | 10-1866004 B1 | 6/2018 |
| KR | 10-2020-0023870 A | 3/2020 |
| KR | 10-2091941 B1 | 3/2020 |
| KR | 10-2022-0089625 A | 6/2022 |

OTHER PUBLICATIONS

Machine translation of KR20200023870 (Year: 2020).*
Machine translation of KR 102091941 (Year: 2020).*

* cited by examiner

*Primary Examiner* — Wyatt P McConnell
(74) *Attorney, Agent, or Firm* — Fox Rothschild LLP

(57) ABSTRACT

Disclosed are an anode active material for an all-solid-state battery in which a lithophilic material is deposited inside and on particles.

20 Claims, 13 Drawing Sheets

ANODE ACTIVE MATERIAL FOR ALL-SOLID-STATE BATTERY

CROSS-REFERENCE TO RELATED APPLICATION

This application is a continuation of U.S. application Ser. No. 18/583,306 filed Feb. 21, 2024 which claims, under 35 U.S.C. § 119 (a), the benefit of priority from Korean Patent Application No. 10-2023-0055387, filed on Apr. 27, 2023, the entire contents of which are incorporated herein by reference.

TECHNICAL FIELD

The present disclosure relates to an anode active material for an all-solid-state battery in which a lithophilic material is deposited in and on particles.

BACKGROUND

A lithium secondary battery is configured to include cathode and anode materials that enable movement of lithium ions therebetween and an electrolyte that is responsible for transporting lithium ions.

Conventional batteries include a separator to prevent physical contact between a cathode and an anode for short circuit prevention. An all-solid-state battery includes a solid electrolyte instead of a separator and a liquid electrolyte. Therefore, an all-solid-state battery has reduced risk of explosion and thus has higher safety. Moreover, a solid electrolyte theoretically has greater ion transfer characteristics than a liquid electrolyte, so that all-solid-state batteries are promising as next-generation high-power and high-energy batteries.

In an all-solid-state battery, all components are solid, such that electrons and ions are transferred through interfaces between particles. Therefore, interfaces between materials have a dominant effect on battery characteristics. With the goal of solving this problem, the transfer of ions and electrons at interfaces has to be controlled, during which reversible reaction of storage and deintercalation of lithium ions is required. In particular, in graphite-based materials, it is absolutely necessary to solve these problems.

SUMMARY

In preferred aspects, provided is an anode for an all-solid-state battery having excellent lithium ion conductivity and storability.

Also provided is an anode for an all-solid-state battery having excellent energy density and lifespan characteristics.

A term "all-solid-state battery" as used herein refers to a rechargeable secondary battery that includes an electrolyte in a solid state for transferring ions between the electrodes of the battery. In an aspect, provided is an anode active material for an all-solid-state battery that includes a particle comprising a plurality of flake carbon fragments overlapped in multiple layers, a first material loaded in a space between the plurality of the flake carbon fragments and having lithophilic property, and a second material applied onto at least a portion of a surface of the particle and having lithophilic property.

As used herein, the term "lithophilic" refers to a material property that has affinity or be attracted toward lithium component (e.g., lithium ion). Often, a lithophilic material, particular, lithophilic metal, by forming an alloy or complex with lithium, can be used to control nucleation sites and stabilize Li (Li ion) deposition (e.g., dendrite) via regulation of nucleation overpotential of Li. Exemplary lithiophilic material (e.g., metal) may include lithium (Li), indium (In), gold (Au), silver (Ag), bismuth (Bi), zinc (Zn), aluminum (Al), iron (Fe), tin (Sn), and titanium (Ti).

In certain embodiments, the flake carbon fragments may be in a scale shape or a film shape so those fragments can be layered or staggered with overlapping regions to form a particular shape.

The particle may have a spherical shape, an elliptical shape, or a rod shape.

A shortest distance between one flake carbon fragment and the adjacent flake carbon fragment may be about 10 nm to 100 nm. The "distance" as used herein refers to a distance measured along a certain cross section of the particle and measured from the closest points between two adjacent flake carbon fragments (e.g., between two adjacent layers of the flake carbon fragments).

The first material may occupy about 80% or greater of the space between the plurality of the flake carbon fragments.

The first material may include one or more selected from the group consisting of silver (Ag), magnesium (Mg), aluminum (Al), gallium (Ga), zinc (Zn), bismuth (Bi), tin (Sn), indium (In), antimony (Sb), lead (Pb), silicon (Si), and germanium (Ge), or an alloy thereof with lithium.

The first material may include silicon (Si) or an alloy of silicon (Si) and lithium, and the first material may be amorphous.

The second material may cover about 90% or greater of the entire surface of the particles.

The thickness of the second material may be about 20 nm to 1,000 nm.

The second material may include one or more selected from the group consisting of silver (Ag), magnesium (Mg), aluminum (Al), gallium (Ga), zinc (Zn), bismuth (Bi), tin (Sn), indium (In), antimony (Sb), lead (Pb), silicon (Si), and germanium (Ge), or an alloy thereof with lithium.

The second material may include silicon (Si) or an alloy of silicon (Si) and lithium, and the second material may be amorphous.

The average particle diameter (D50) of the anode active material may be about 1 μm to 20 μm.

The anode active material may include an amount of about 40 wt % to 90 wt % of the particles and an amount of about 10 wt % to 60 wt % of a sum of the first material and the second material. The wt % is based on the total weight of the anode active material.

The specific surface area of the anode active material may be about 0.5 $m^2/g$ to 4 $m^2/g$.

In an aspect, provided is an anode active material for an all-solid-state battery. The anode active material may include a secondary particle including a plurality of primary particles overlapped in multiple layers and spheroidized. Each of the primary particles includes a flake carbon fragment and a coating part applied onto a surface of the flake carbon fragment and including a lithophilic material.

The coating part may include one or more selected from the group consisting of silver (Ag), magnesium (Mg), aluminum (Al), gallium (Ga), zinc (Zn), bismuth (Bi), tin (Sn), indium (In), antimony (Sb), lead (Pb), silicon (Si), and germanium (Ge), or an alloy thereof with lithium.

The coating part may cover about 90% or greater of the surface of the flake carbon fragment.

The thickness of the coating part may be about 20 nm to 1,000 nm.

The anode active material may include an amount of about 40 wt % to 90 wt % of the plurality of the flake carbon fragments and an amount of about 10 wt % to 60 wt % of the coating part, based on the total weight of the anode active material.

In another aspect, provided is an all-solid-state battery including the anode as described herein.

Also provided is a vehicle including the all-solid-state battery as described herein.

Other aspects of the invention are disclosed infra.

BRIEF DESCRIPTION OF THE DRAWINGS

The above and other features of the present disclosure will now be described in detail with reference to certain exemplary embodiments thereof illustrated in the accompanying drawings, which are given hereinbelow by way of illustration only, and thus are not limitative of the present disclosure, and wherein.

DETAILED DESCRIPTION

Figure 1:
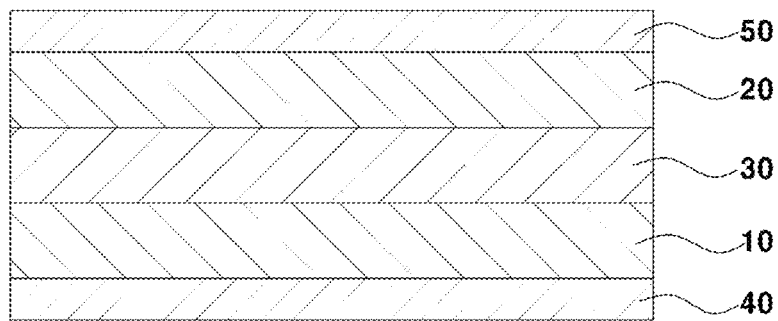
FIG. 1 shows an exemplary all-solid-state battery according to an exemplary embodiment of the present disclosure.

The above and other objects, features and advantages of the present disclosure will be more clearly understood from the following preferred embodiments taken in conjunction with the accompanying drawings. However, the present disclosure is not limited to the embodiments disclosed herein, and may be modified into different forms. These embodiments are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In certain preferred aspects, a vehicle may be electric-powered, including a hybrid vehicles, plug-in hybrids, or vehicles where electric power is the primary or sole power source.

FIG. 1 shows an exemplary all-solid-state battery according to an exemplary embodiment of the present disclosure. The all-solid-state battery may include an anode 10, a cathode 20, and a solid electrolyte layer 30 interposed between the anode 10 and the cathode 20. An anode current collector 40 may be attached to the anode 10, and a cathode current collector 50 may be attached to the cathode 20.

The anode 10 may be provided in the form of a sheet having at least two opposing main surfaces. Each of the two main surfaces may include not only a mathematical plane, but also a certain curved surface in part, and may have irregularities generated in the manufacture of the anode 10. As such, the sheet shape is not limited to a relatively thin cuboid.

For the anode 10 in sheet form, the distance between two opposing main surfaces may be the thickness of the anode 10. The length of the anode 10 in the first direction (e.g. width direction) orthogonal to the thickness direction is greater than the thickness. Also, the length of the anode 10 in the second direction (e.g. longitudinal direction) orthogonal to each of the thickness direction and the first direction is greater than the thickness.

The thickness of the anode 10 is not particularly limited, but may be about 1 µm to 100 µm. The thickness of the anode 10 may indicate an average value when measuring a measurement target on a 5-point scale. Also, the thickness of the anode 10 may indicate the thickness when the all-solid-state battery is discharged.

The anode 10 may include an anode active material, a solid electrolyte, a binder, and the like.

Figure 2:
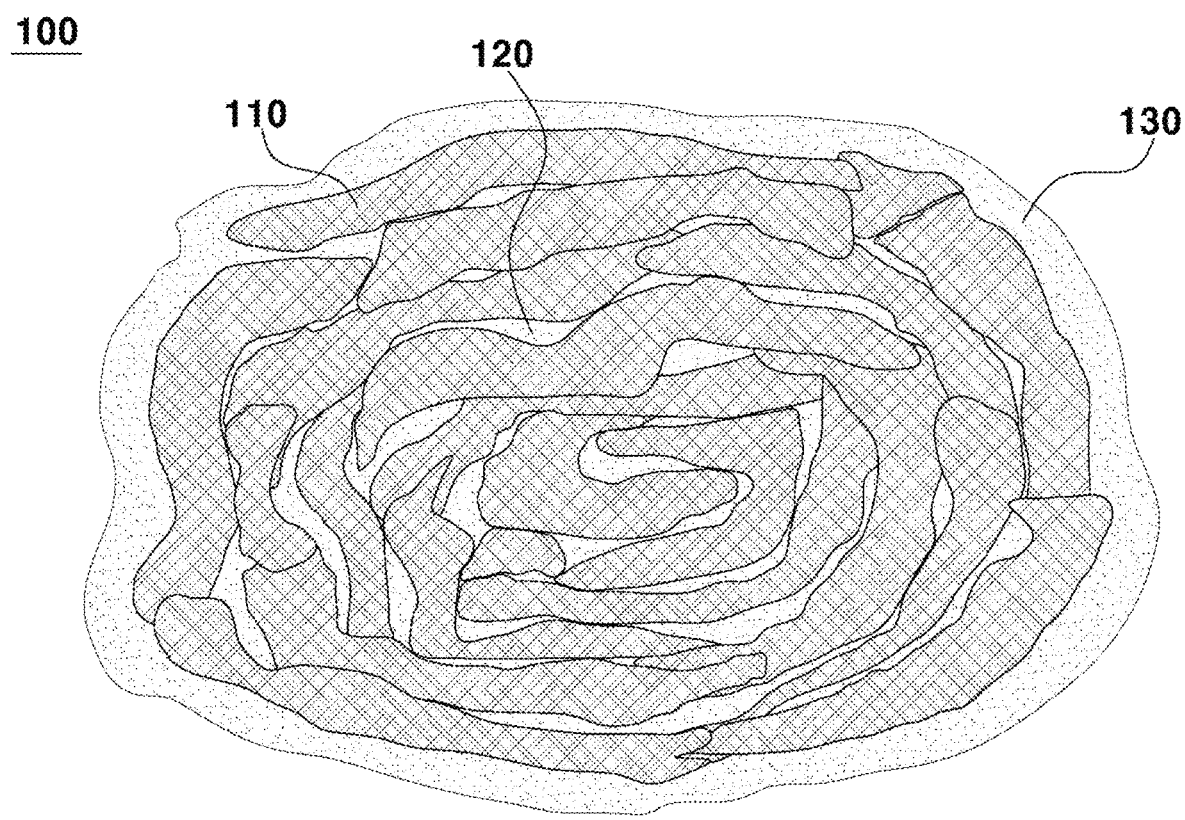
FIG. 2 shows an exemplary anode active material according to a first embodiment of the present disclosure.

FIG. 2 shows an exemplary anode active material 100 according to a first embodiment of the present disclosure. The anode active material 100 may include a particle 110 each forming a predetermined shape, a first material 120 loaded in the particles 110 and having lithiophilic property, and a second material 130 applied onto at least a portion of the surface of the particle 110 and having lithiophilic property.

A conventional all-solid-state battery includes a graphite-based anode active material. Lithium ions ($Li^+$) are intercalated into and deintercalated from the graphite-based anode active material as charging and discharging proceed. In a lithium ion battery using a liquid electrolyte, since inside and outside of the graphite-based anode active material are impregnated with the liquid electrolyte, there is no problem in movement of lithium ions. However, in an all-solid-state battery using a solid electrolyte, lithium ions are efficiently conducted at the contact portion between the surface of the graphite-based anode active material and the solid electrolyte, but only diffusion-induced movement is possible inside the graphite-based anode active material, and thus the transfer path of lithium ions becomes very long. Specifically, at room temperature or low temperatures at which the movement speed by diffusion is low, power output of the all-solid-state battery is very low, and lithium is easily precipitated, which is undesirable.

Also, in the conventional all-solid-state battery, a solid electrolyte interphase layer is formed through oxidation/reduction reaction of carbon, solid electrolyte, lithium ions ($Li^+$), and electrons at the interface between the graphite-based anode active material and the solid electrolyte. The solid electrolyte interphase layer induces depletion of lithium in the battery and hinders intercalation and deintercalation of lithium ions ($Li^+$). Moreover, the solid electrolyte interphase layer induces formation of lithium dendrites on the surface of the solid electrolyte, shortening the lifespan of the battery.

The present disclosure aims to solve the problems with the conventional graphite-based anode active material described above, and by sufficiently depositing materials having lithiophilic property in and on the particles 110, lithium ion conductivity inside the anode active material 100 is increased, and side reaction between the particles 110 and the solid electrolyte is prevented by evening the interface between the anode active material 100 and the solid electrolyte, which will be described later.

Figure 3:
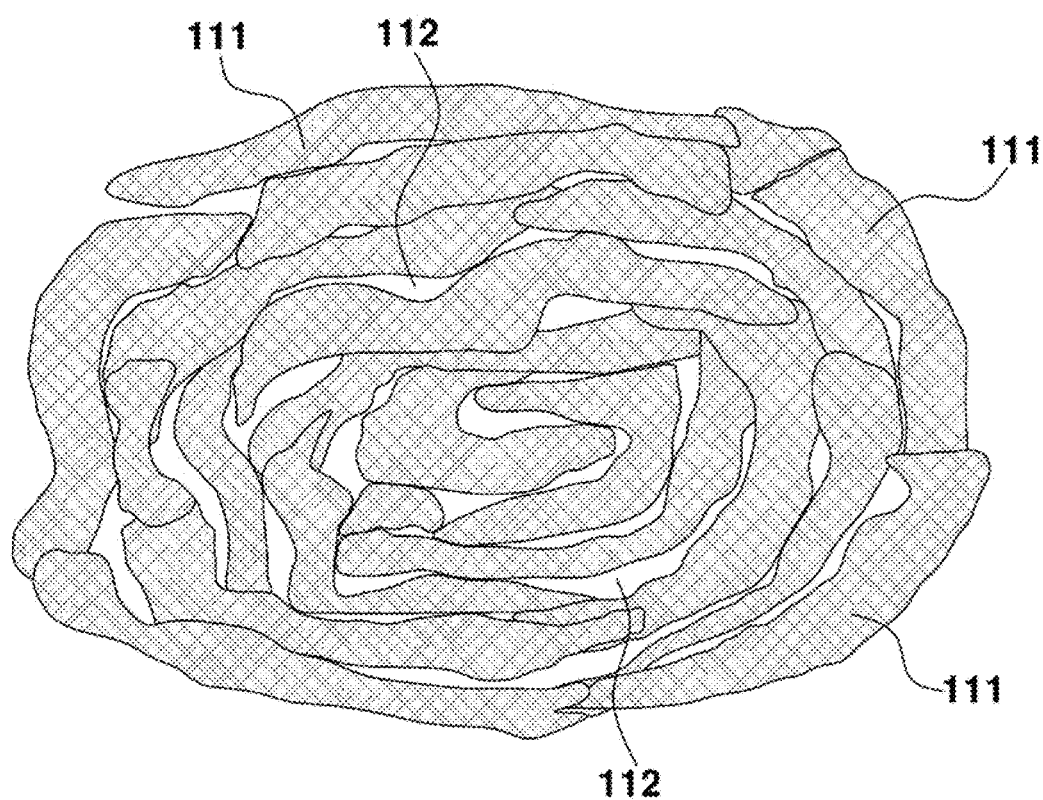
FIG. 3 shows an exemplary particle included in the anode active material.

FIG. 3 shows an exemplary particle 110. The particle 110 may include flake carbon fragments 111 overlapped in multiple layers and a space 112 between the flake carbon fragments.

For example, the particle 110 may be configured such that the flake carbon fragments 111 are assembled in a concentric shape, a cabbage shape, or randomly. Although the particle 110 of FIG. 3 is spherical, the shape of the particles 110 is not limited thereto, and the particles 110 may have an elliptical shape, a rod shape, etc.

The flake carbon fragments 111 may be thin plate-like pieces having the same shape as scales.

A shortest distance between one of the flake carbon fragments 111 and the adjacent flake carbon fragment may be about 10 nm to 100 nm. Here, the shortest distance may indicate a distance between one layer and another layer formed by the flake carbon fragments 111 when forming multiple layers by stacking the flake carbon fragments 111. Also, the shortest distance may indicate the size of the space 112 based on the cross section of the flake carbon fragments 111. When the shortest distance is less than about 10 nm, it may be difficult for the first material 120 to be deposited in the space 112. When the shortest distance is greater than about 100 nm, conductivity of lithium ions ($Li^+$) in the anode active material 100 may deteriorate.

The space 112 may be a pore in the particles 110 generated in the process of forming particles by overlapping the flake carbon fragments 111 in multiple layers. The space 112 may be formed continuously or intermittently from the surface of the particles 110 to the center of the particles 110.

The space 112 between the flake carbon fragments 111 may be filled with the first material 120. Also, the first material 120 may include a metal or metalloid having lithiophilic property. Here, lithiophilic property may indicate ability to form an alloy with lithium. The lithium alloy may attract lithium ions ($Li^+$) to increase the diffusion speed of the lithium ions ($Li^+$).

As described above, the space 112 may be continuously formed from the surface of the particles 110 to the center of the particles 110, and thus, when the space 112 is filled with the first material 120, lithium ions ($Li^+$) may move more easily in the anode active material 100. Therefore, even when the all-solid-state battery according to the present disclosure operates at room temperature or low temperatures, problems such as power output degradation, excessive lithium precipitation, etc. may not occur, which will be described later.

The first material 120 may occupy about 80% or greater of the space 112 based on the total volume of the space 112. When the rate of filling with the first material 120 is less than about 80%, movement of lithium ions (Li$^+$) inside the anode active material 100 may be inefficient. The upper limit of the rate of filling with the first material 120 is not particularly limited, and may be about 100% or less, about 99% or less, about 95% or less, or about 90% or less.

The first material 120 may include one or more selected from the group consisting of silver (Ag), magnesium (Mg), aluminum (Al), gallium (Ga), zinc (Zn), bismuth (Bi), tin (Sn), indium (In), antimony (Sb), lead (Pb), silicon (Si), and germanium (Ge), or an alloy thereof with lithium.

Preferably, the first material 120 may suitably include silicon (Si) or an alloy of silicon (Si) and lithium. More preferably, the first material 120 may include amorphous silicon (Si) or an alloy of amorphous silicon (Si) and lithium. Since amorphous silicon undergoes isotropic expansion, deformation and detachment of the first material 120 may be minimized, and transfer of lithium ions (Li$^+$) between the first material 120 and the particles 110 may become easy.

The second material 130 may cover at least a portion of the surface of the particles 110. The second material 130 may prevent the particles 110 from contacting the solid electrolyte. When the particles 110 are exposed to the outside and contact the solid electrolyte, the solid electrolyte may be decomposed due to high electron conductivity of the particles 110.

The second material 130 may include a metal or metalloid having lithium affinity. Since the second material 130 covers most of the surface of the particles 110, lithium ions (Lit) conducted through the solid electrolyte may be rapidly intercalated into the anode active material 100 compared to when the second material 130 is absent. This is because the second material 130 transfers lithium ions (Li$^+$) faster than the particles 110.

The second material 130 may cover about 90% or greater of the entire surface area of the particles 110. The upper limit of the coverage of the second material 130 is not particularly limited, and may be about 100% or less, about 99% or less, or about 95% or less.

The second material 130 may have a thickness of about 20 nm to 1,000 nm. The thickness of the second material 130 may be measured using, for example, a transmission electron microscope (TEM). The use of a large number of samples is preferable. For example, the thickness of the second material 130 formed in 10 or more, preferably 100 or greater anode active materials 100 may be measured and calculated as an average value. When the thickness thereof is less than about 20 nm, the second material 130 may not sufficiently cover the surface of the particles 110. When it is greater than about 1,000 nm, productivity may deteriorate and properties of the anode active material 100 may be adversely affected.

The second material 130 may include one or more selected from the group consisting of silver (Ag), magnesium (Mg), aluminum (Al), gallium (Ga), zinc (Zn), bismuth (Bi), tin (Sn), indium (In), antimony (Sb), lead (Pb), silicon (Si), and germanium (Ge), or an alloy thereof with lithium.

Preferably, the second material 130 may include silicon (Si) or an alloy of silicon (Si) and lithium. More preferably, the second material 130 may suitably include amorphous silicon (Si) or an alloy of amorphous silicon (Si) and lithium. Since amorphous silicon undergoes isotropic expansion, deformation and detachment of the second material 130 may be minimized, and transfer of lithium ions (Li$^+$) between the second material 130 and the particles 110 may become easy.

The anode active material 100 may include about 40 wt % to 90 wt % of the particles 110 and about 10 wt % to 60 wt % of the sum of the first material 120 and the second material 130, based on the total weight of the anode active material. When the combined weight of the first material 120 and the second material 130 is less than about 10 wt %, the first material 120 may not sufficiently fill the space 112 or the second material 130 may not sufficiently cover the surface of the particles 110. On the other hand, when the combined weight of the first material 120 and the second material 130 is greater than about 60 wt %, the second material 130 may become excessively thick.

An average particle diameter (D50) of the anode active material 100 may be about 1 μm to 20 μm. The average particle diameter (D50) may be measured using a commercially available laser diffraction scattering-type particle size distribution analyzer, for example, a Microtrac particle size distribution analyzer. Alternatively, 200 particles may be randomly extracted from an electron micrograph and the average particle diameter thereof may be calculated. When the average particle diameter (D50) of the anode active material 100 is about 1 μm or greater, the density of the anode 10 may be increased, thus improving discharge capacity per volume, and when the average particle diameter thereof is 20 μm or less, charging and cycle characteristics may be improved.

The specific surface area of the anode active material 100 may be about 0.5 m$^2$/g to 4 m$^2$/g. The specific surface area may be measured using a BET (Brunauer-Emmett-Teller) method by nitrogen adsorption, and for example, a typical specific surface area measuring instrument (MOUNTECH's Macsorb HM (model 1210) or MicrotracBEL's Belsorp-mini) may be used. When the specific surface area thereof falls within the above numerical range, it may be advantageous to suppress volume expansion of the anode active material 100.

A method of manufacturing the anode active material 100 is not particularly limited. An anode active material 100 may be manufactured by preparing particles 110 each forming a predetermined shape by overlapping the flake carbon fragments 111 in multiple layers as shown in FIG. 3, and then depositing a metal or metalloid corresponding to the first material 120 and the second material 130 to the particles 110. The deposition may be, for example, chemical vapor deposition (CVD) or physical vapor deposition (PVD), and chemical vapor deposition is preferable in consideration of the rate of filling with the first material 120, the coverage of the second material 130, and the uniform thickness of the second material 130.

The anode 10 may include a solid electrolyte having lithium ion conductivity. The solid electrolyte may include an oxide-based solid electrolyte or a sulfide-based solid electrolyte. It is preferable to use a sulfide-based solid electrolyte having high lithium ion conductivity.

Examples of the sulfide-based solid electrolyte may suitably include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which m and n are positive numbers and Z is any one selected from among Ge, Zn, and Ga), $Li_2S$—$GeS_2$, $Li_2S$—$SiS_2$—$Li_3PO_4$, $Li_2S$—$SiS_2$-$Li_xMO_y$, (in which x and y are positive numbers and M is any one selected from among P, Si, Ge, B, Al, Ga, and In), $Li_{10}GeP_2S_{12}$, and the like.

Figure 4:
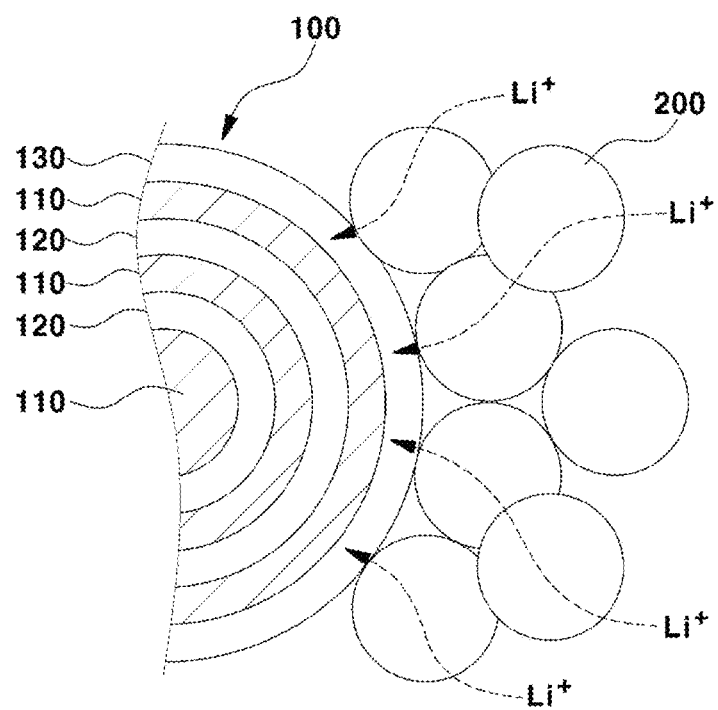
FIG. 4 shows movement of lithium ions ($Li^+$) between an anode active material and a solid electrolyte in an anode according to an exemplary embodiment of the present disclosure.
Figure 5A:
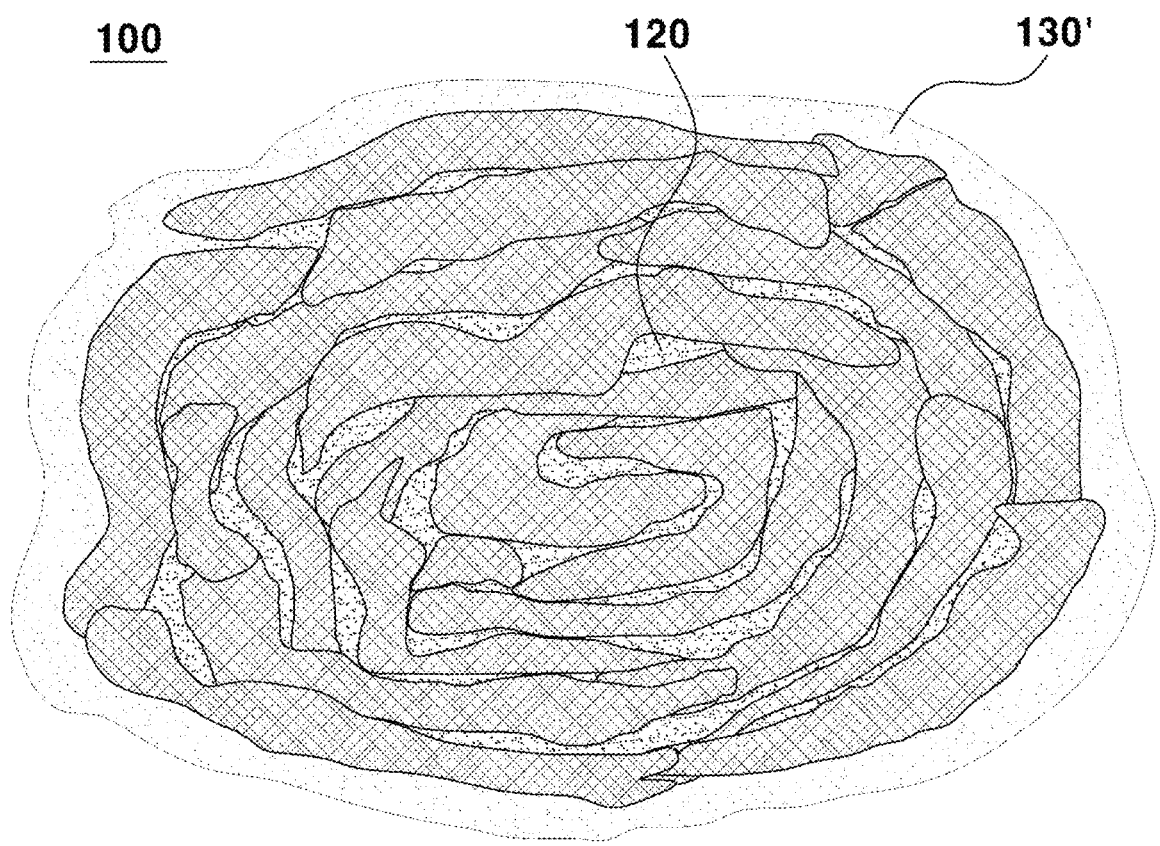
FIG. 5A shows the anode active material at the beginning of charging.
Figure 5B:
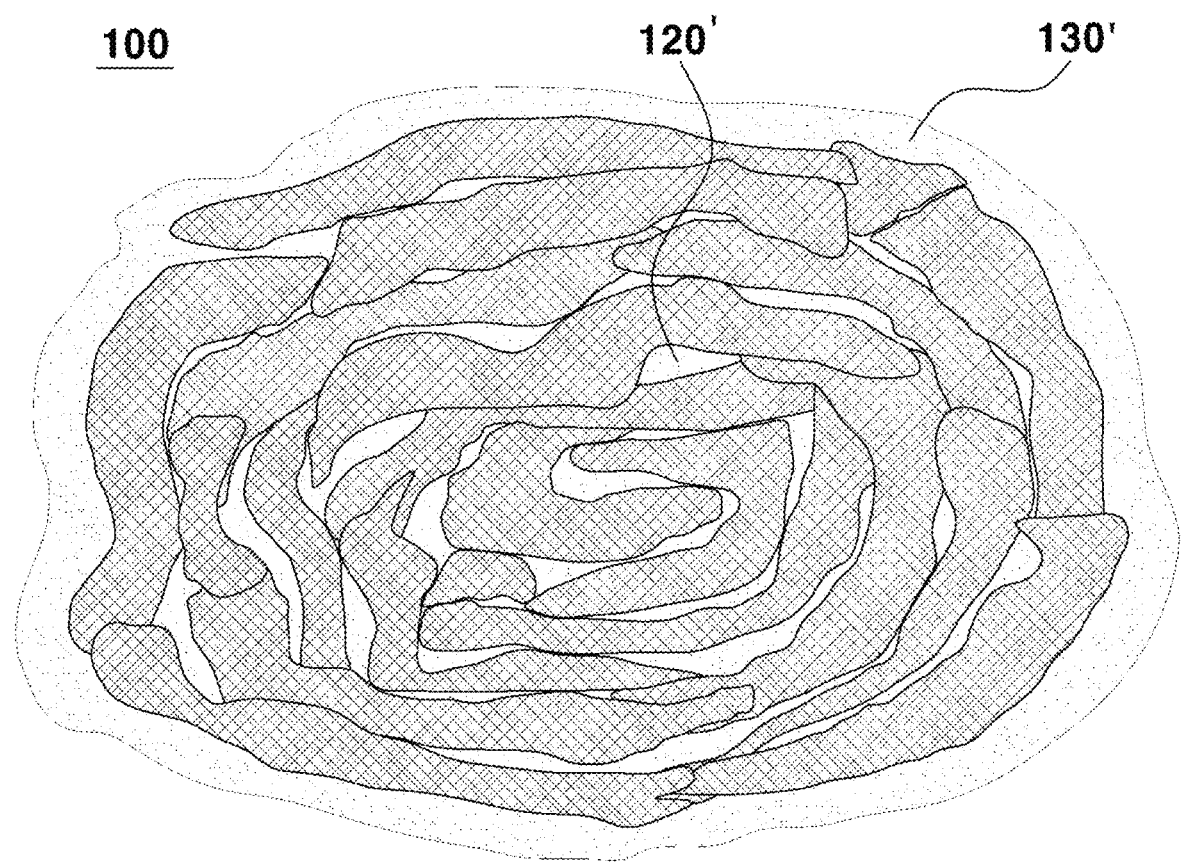
FIG. 5B shows the anode active material during charging.

FIG. 4 shows movement of lithium ions ($Li^+$) between the anode active material 100 and the solid electrolyte 200 in the anode 10 according to the present disclosure. FIG. 5A shows the anode active material 100 at the beginning of charging, and FIG. 5B shows the anode active material 100 during charging.

During charging of an all-solid-state battery, lithium ions ($Li^+$) moved from the cathode 20 to the anode 10 are intercalated into the anode active material 100 through the solid electrolyte 200 having lithium ion conductivity in the anode 10.

Since the second material 130 covers most of the surface of the particles 110, the particles 110 may not come into contact with the solid electrolyte 200. Accordingly, a solid electrolyte interphase layer resulting from oxidation and reduction of the particles 110, the solid electrolyte 200, lithium ions ($Li^+$), and electrons may not be present on the surface of the anode active material 100. The solid electrolyte interphase layer induces depletion of lithium in an all-solid-state battery and hinders intercalation and deintercalation of lithium ions ($Li^+$). In the present disclosure, the problems described above may be solved by applying the second material 130 onto the surface of the particles 110.

As shown in FIGS. 4 and 5A, lithium ions ($Li^+$) conducted to the anode active material 100 through the solid electrolyte 200 at the beginning of charging may react with the second material 130 to form an outer lithium alloy 130'.

When charging further progresses, the lithium ions ($Li^+$) may diffuse into the anode active material 100. The lithium ions ($Li^+$) are intercalated into the particles 110. The first material 120 with which the particles 110 are filled may react with the lithium ions ($Li^+$) to form an inner lithium alloy 120' as shown in FIG. 5B. The inner lithium alloy 120' may serve as a transfer path of lithium ions ($Li^+$), and the diffusion speed of the lithium ions ($Li^+$) is increased.

Thereafter, lithium ions ($Li^+$) are further diffused into the anode active material 100 and intercalated into the particles 110 until they reach the capacity of the particles 110, whereby charging is completed.

Since the transfer path of lithium ions ($Li^+$) in the anode active material 100 is short and the diffusion thereof is fast, the all-solid-state battery according to exemplary embodiments of the present disclosure may operate normally even at room temperature or low temperatures or with increased power output.

The anode 10 may include a binder. The binder may attach the anode active material 100 and the solid electrolyte 200 to each other.

The type of binder is not particularly limited, and examples thereof may include butadiene rubber, nitrile butadiene rubber, hydrogenated nitrile butadiene rubber, polyvinylidene fluoride (PVDF), polytetrafluoroethylene (PTFE), carboxymethyl cellulose (CMC), and the like.

The anode 10 may include an amount of about 80 wt % to 85 wt % of the anode active material 100, an amount of about 10 wt % to 15 wt % of the solid electrolyte 200, and an amount of about 1 wt % to 5 wt % of the binder, based on the total weight of the anode. However, the amounts of individual components may be appropriately adjusted in consideration of the desired capacity and efficiency of an all-solid-state battery.

Figure 6:
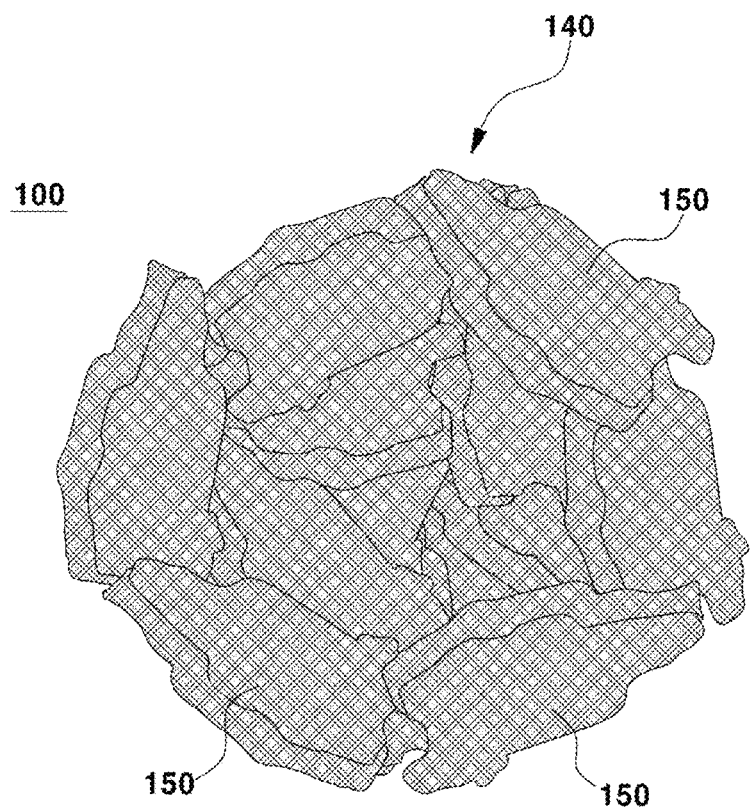
FIG. 6 shows an exemplary anode active material according to a second embodiment of the present disclosure.

FIG. 6 shows an anode active material 100 according to a second embodiment of the present disclosure. The anode active material 100 may include a secondary particle 140 each configured such that primary particles 150 are overlapped in multiple layers and spheroidizied.

Figure 7:
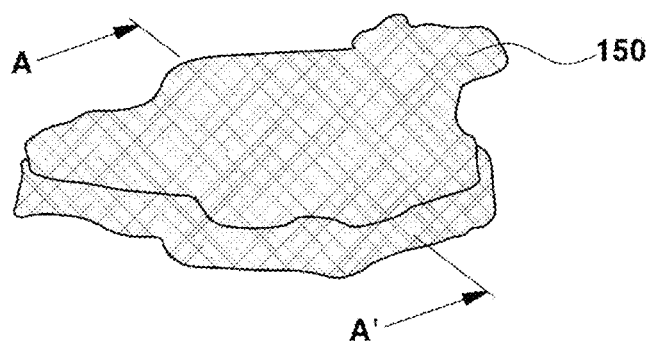
FIG. 7 shows a primary particle included in the anode active material.
Figure 8:
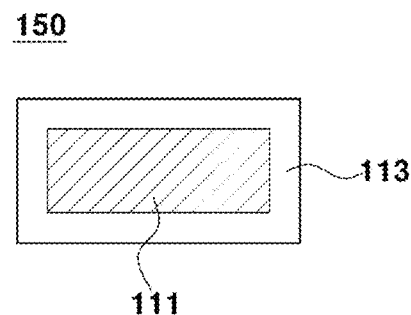
FIG. 8 shows a cross-sectional view taken along line A-A' of FIG. 7.
Figure 9:
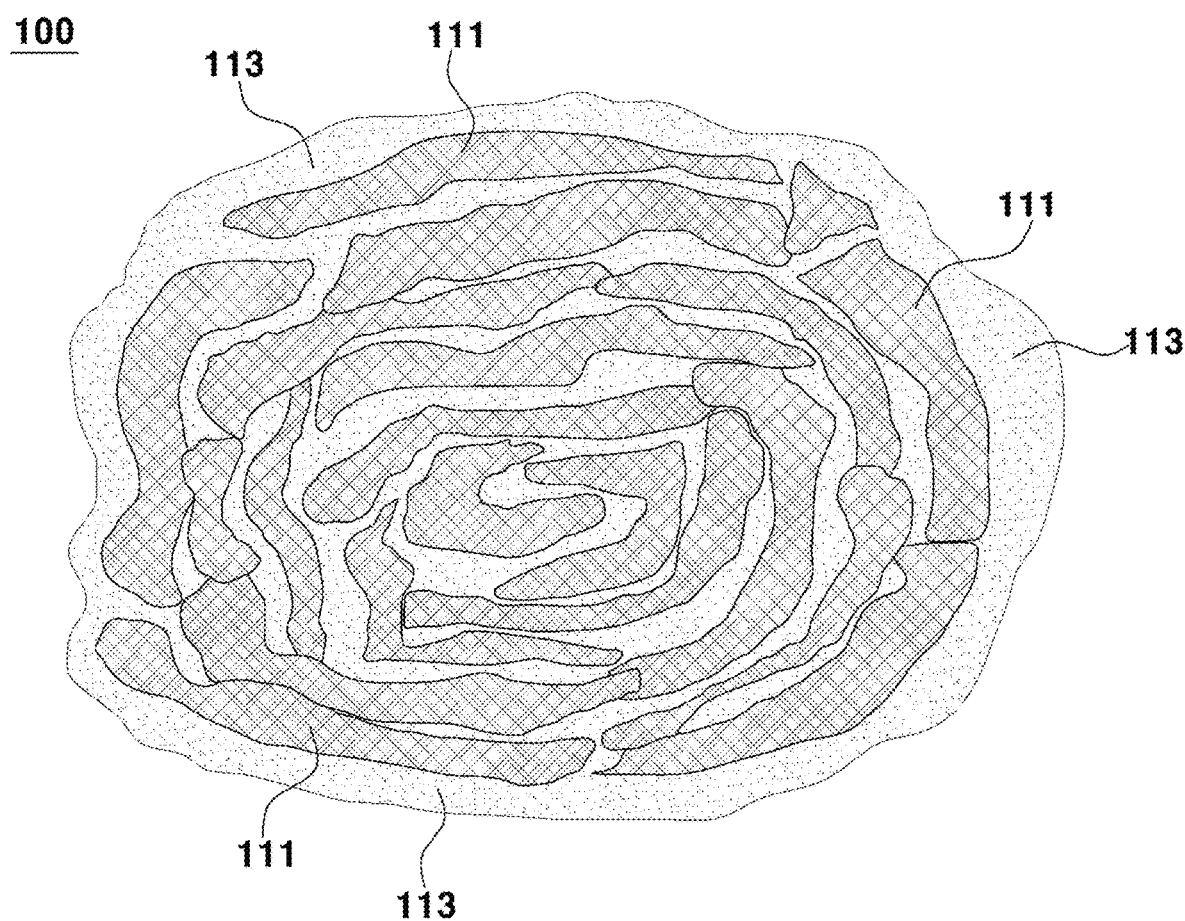
FIG. 9 shows a cross-sectional view of the anode active material of FIG. 6.

FIG. 7 shows a primary particle 150. FIG. 8 shows a cross-sectional view taken along line A-A' of FIG. 7. FIG. 9 shows a cross-sectional view of the anode active material 100 of FIG. 6.

The secondary particle 140 may be configured such that the primary particles 150 are assembled in a concentric shape, a cabbage shape, or randomly. The secondary particle 140 of FIG. 6 is spherical, but the shape of the secondary particles 140 is not limited thereto, and the secondary particles 140 may have an elliptical shape, a rod shape, or the like.

The primary particles 150 each may include a flake carbon fragment 111 and a coating part 113 applied onto the surface of the flake carbon fragment 111 and including a lithiophilic material.

Since the flake carbon fragment 111 is described above, a detailed description thereof will be omitted below.

The coating part 113 may cover about 90% or greater of the surface of the flake carbon fragment 111. The upper limit of the coverage of the coating part 113 is not particularly limited, and may be about 100% or less, about 99% or less, or about 95% or less. When the coverage of the coating part 113 is about 90% or greater, as shown in FIG. 9, the inside and surface of the anode active material 100 may be sufficiently filled with and/or coated with a lithiophilic material.

The coating part 113 may have a thickness of about 20 nm to 1,000 nm. The thickness of the coating part 113 may be measured using, for example, a transmission electron microscope (TEM). The use of a large number of samples is preferable. For example, the thickness of the coating part 113 formed in 10 or greater, preferably 100 or greater primary particles 150 may be measured and calculated as an average value.

The anode active material 100 may include about 40 wt % to 90 wt % of the flake carbon fragment 111 and about 10 wt % to 60 wt % of the coating part 113, based on the total weight of the anode active material. When the amount of the coating part 113 is less than about 10 wt %, it may be difficult to sufficiently fill and/or coat the inside and surface of the anode active material 100 with a lithiophilic material, whereas if the amount thereof is greater than about 60 wt %, the coating part 113 may become excessively thick.

The coating part 113 may include one or more selected from the group consisting of silver (Ag), magnesium (Mg), aluminum (Al), gallium (Ga), zinc (Zn), bismuth (Bi), tin ($S_n$), indium (In), antimony (Sb), lead (Pb), silicon (Si), and germanium (Ge), or an alloy thereof with lithium.

Preferably, the coating part 113 may include silicon (Si) or an alloy of silicon (Si) and lithium. More preferably, the coating part 113 may suitably include amorphous silicon (Si) or an alloy of amorphous silicon (Si) and lithium. Since amorphous silicon undergoes isotropic expansion, deformation and separation of the coating part 113 may be minimized, and transfer of lithium ions (Lit) between the coating part 113 and the flake carbon fragment 111 may become easy.

A method of manufacturing the anode active material 100 is not particularly limited. The anode active material 100 may be manufactured in a manner in which primary particles 150 are prepared by depositing a lithiophilic material on the surface of the flake carbon fragments 111, after which the primary particles 150 are overlapped in multiple layers and spheroidized to form secondary particles 140.

The cathode 20 may be provided in the form of a sheet having at least two opposing main surfaces. Each of the two main surfaces may include not only a mathematical plane, but also a certain curved surface in part, and may have irregularities generated in the manufacture of the cathode 20. As such, the sheet shape is not limited to a relatively thin cuboid.

For the cathode 20 in sheet form, the distance between two opposing main surfaces may be the thickness of the cathode 20. The length of the cathode 20 in the first direction (e.g. width direction) orthogonal to the thickness direction is greater than the thickness. Also, the length of the cathode 20 in the second direction (e.g. longitudinal direction) orthogonal to each of the thickness direction and the first direction is greater than the thickness.

The thickness of the cathode 20 is not particularly limited, but may be about 1 μm to 100 μm. The thickness of the cathode 20 may indicate an average value when measuring a measurement target on a 5-point scale. Also, the thickness of the cathode 20 may indicate the thickness when the all-solid-state battery is discharged.

The cathode 20 may include a cathode active material, a solid electrolyte, a conductive material, a binder, and the like.

The cathode active material is capable of occluding and releasing lithium ions.

The cathode active material may suitably include a rock-salt-layer-type active material such as $LiCoO_2$, $LiMnO_2$, $LiNiO_2$, $LiVO_2$, $Li_{1+x}Ni_{1/3}CO_{1/3}Mn_{1/3}O_2$, etc., a spinel-type active material such as $LiMn_2O_4$, $Li(Ni_{0.5}Mn_{1.5})O_4$, etc., an inverse-spinel-type active material such as $LiNiVO_4$, $LiCoVO_4$, etc., an olivine-type active material such as $LiFePO_4$, $LiMnPO_4$, $LiCoPO_4$, $LiNiPO_4$, etc., a silicon-containing active material such as $Li_2FeSiO_4$, $Li_2MnSiO_4$, etc., a rock-salt-layer-type active material in which a portion of a transition metal is substituted with a different metal, such as $LiNi_{0.8}CO_{(0.2-x)}Al_xO_2$ (0<x<0.2), a spinel-type active material in which a portion of a transition metal is substituted with a different metal, such as $Li_{1+x}Mn_{2-x-y}M_yO_4$ (M being at least one selected from among Al, Mg, Co, Fe, Ni, and Zn, 0<x+y<2), lithium titanate such as $Li_4Ti_5O_{12}$, and the like.

The solid electrolyte may include an oxide-based solid electrolyte or a sulfide-based solid electrolyte. It is preferable to use a sulfide-based solid electrolyte having high lithium ion conductivity. The sulfide-based solid electrolyte is not particularly limited, but examples thereof may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which m and n are positive numbers and Z is any one selected from among Ge, Zn, and Ga), $Li_2S$—$GeS_2$, $Li_2S$—$SiS_2$—$Li_3PO_4$, $Li_2S$—$SiS_2$-$Li_xMO_y$ (in which x and y are positive numbers and M is any one selected from among P, Si, Ge, B, Al, Ga, and In), $Li_{10}GeP_2S_{12}$, and the like. The solid electrolyte included in the cathode 20 may be the same as or different from the solid electrolyte included in the anode 10.

Examples of the conductive material may include carbon black, conductive graphite, ethylene black, graphene, and the like.

Examples of the binder may suitably include butadiene rubber, nitrile butadiene rubber, hydrogenated nitrile butadiene rubber, polyvinylidene fluoride (PVDF), polytetrafluoroethylene (PTFE), carboxymethyl cellulose (CMC), and the like. The binder included in the cathode 20 may be the same as or different from the binder included in the anode 10.

The solid electrolyte layer 30 may be provided in the form of a sheet having at least two opposing main surfaces. Each of the two main surfaces may include not only a mathematical plane, but also a certain curved surface in part, and may have irregularities generated in the manufacture of the solid electrolyte layer 30. As such, the sheet shape is not limited to a relatively thin cuboid.

For the solid electrolyte layer 30 in sheet form, the distance between two opposing main surfaces may be the thickness of the solid electrolyte layer 30. The length of the solid electrolyte layer 30 in the first direction (e.g. width direction) orthogonal to the thickness direction is greater than the thickness. Also, the length of the solid electrolyte layer 30 in the second direction (e.g. longitudinal direction) orthogonal to each of the thickness direction and the first direction is greater than the thickness.

The thickness of the solid electrolyte layer 30 is not particularly limited, but may be about 1 μm to 100 μm. The thickness of the solid electrolyte layer 30 may indicate an average value when measuring a measurement target on a 5-point scale.

The solid electrolyte layer 30 may include a solid electrolyte having lithium ion conductivity. The solid electrolyte may include one or more selected from the group consisting of an oxide-based solid electrolyte, and a sulfide-based solid electrolyte. Also, the solid electrolyte may be crystalline, amorphous, or a mixed state thereof.

Examples of the oxide-based solid electrolyte may suitably include perovskite-type LLTO ($Li_{3x}La_{2/3-x}TiO_3$), phosphate-based NASICON-type LATP ($Li_{1+x}Al_xTi_{2-x}(PO_4)_3$), and the like.

Examples of the sulfide-based solid electrolyte may include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (in which m and n are positive numbers and Z is any one selected from among Ge, Zn, and Ga), $Li_2S$—$GeS_2$, $Li_2S$—$SiS_2$—$Li_3PO_4$, $Li_2S$—$SiS_2$-$Li_xMO_y$ (in which x and y are positive numbers and M is any one selected from among P, Si, Ge, B, Al, Ga, and In), $Li_{10}GeP_2S_{12}$, and the like.

Preferably, the solid electrolyte suitably includes a sulfide-based solid electrolyte having an argyrodite crystal structure. The sulfide-based solid electrolyte having the argyrodite crystal structure may include at least one selected from the group consisting of $Li_{7-x}PS_{6-x}Cl_x$ (0<x≤2), $Li_{7-x}PS_{6-x}Br_x$ (0<x≤2), $Li_{7-x}PS_{6-x}I_x$ (0<x≤2), and combinations thereof.

The anode current collector 40 may be a plate-like substrate having electrical conductivity. Specifically, the anode current collector 40 may be provided in the form of a sheet, a thin film, or a foil.

The anode current collector 40 may include a material that does not react with lithium. Specifically, the anode current collector 40 may include at least one selected from the group consisting of nickel (Ni), copper (Cu), stainless steel, and combinations thereof.

The thickness of the anode current collector 40 is not particularly limited, and may be, for example, about 1 μm to 500 μm.

The cathode current collector 50 may include a plate-like substrate having electrical conductivity. Specifically, the cathode current collector 50 may be provided in the form of a sheet, a thin film, or a foil.

The cathode current collector 50 may include aluminum foil.

The thickness of the cathode current collector 50 is not particularly limited, and may be, for example, about 1 μm to 500 μm.

EXAMPLE

A better understanding of the present disclosure may be obtained through the following examples. These examples are merely set forth to illustrate the present disclosure, and are not to be construed as limiting the scope of the present disclosure.

Preparation Example

Particles having a shape close to a spherical or elliptical shape were prepared by overlapping flake carbon fragments in multiple layers. Silicon was deposited in and on the particles through chemical vapor deposition. Specifically, the particles were placed in a chamber and the chamber was evacuated, after which a reactive gas containing silicon was injected into the chamber. The inside of the chamber was heated to a predetermined temperature, so that silicon contained in the reactive gas was deposited in and on the particles as a first material and a second material, respectively, thereby manufacturing an anode active material.

The anode active material according to Preparation Example includes about 70 wt % of the particles and about 30 wt % of the sum of the first material and the second material.

Figure 10:
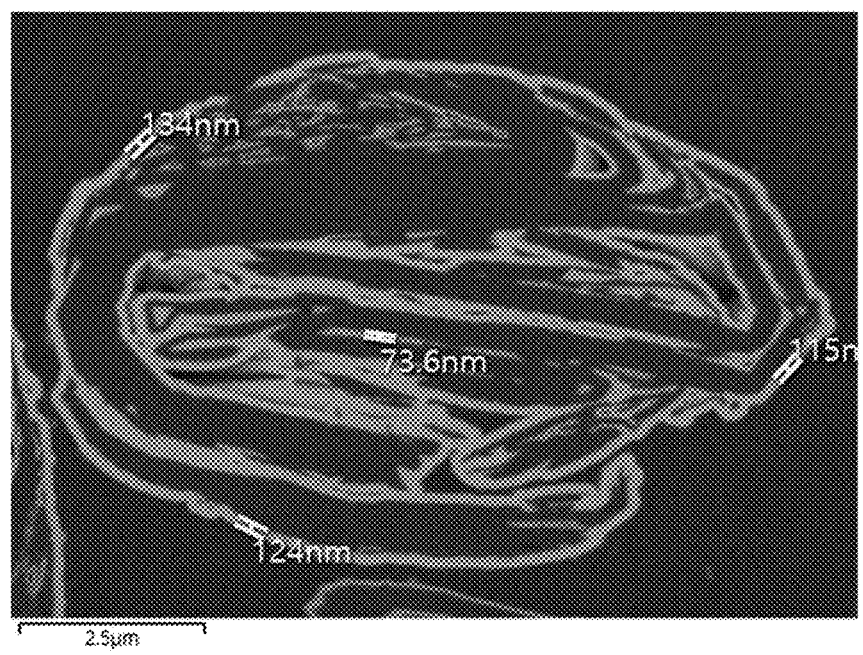
FIG. 10 is a scanning electron microscope image showing a cross section of an anode active material according to Preparation Example.

FIG. 10 shows a scanning electron microscope image of the cross section of the anode active material according to Preparation Example. The dark part represents particles in which flake carbon fragments are overlapped in multiple layers and rounded, and the bright part represents the first material and the second material. With reference thereto, the thickness of the second material applied onto the surface of the particles was determined to be about 20 nm to 1,000 nm, and was observed to be uniform with little variation.

Comparative Preparation Example 1

The particles of Preparation Example to which silicon was not deposited were set as Comparative Preparation Example 1.

Comparative Preparation Example 2

An anode active material was manufactured in the same manner as in Preparation Example, with the exception that the anode active material included about 95 wt % of the particles and about 5 wt % of the sum of the first material and the second material.

Example 1

A slurry was prepared by adding the anode active material according to Preparation Example, a sulfide-based solid electrolyte, and a binder to a solvent. The slurry was applied onto an anode current collector to form an anode having a thickness of about 50 μm. Nitrile butadiene rubber (NBR) was used as the binder, and hexyl butyrate was used as the solvent.

Figure 11:
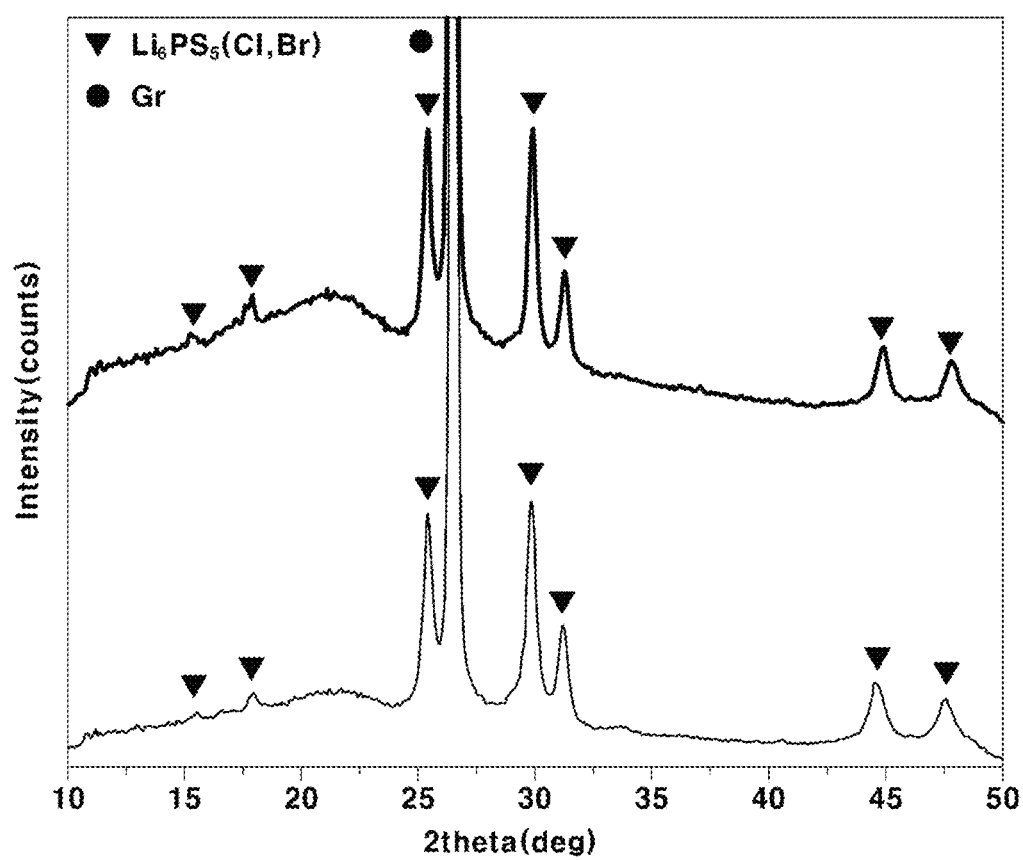
FIG. 11 shows results of X-ray spectroscopy of an anode according to Example 1.

FIG. 11 shows results of X-ray spectroscopy of the anode according to Example 1, in which the bottom graph shows the anode immediately after manufacture, and the top graph shows the anode after 2 weeks. Peaks due to the solid electrolyte and the particles were observed, whereas peaks due to silicon were not observed, indicating that the silicon deposited to the anode active material was amorphous.

A half-cell was manufactured by stacking a solid electrolyte layer including a sulfide-based solid electrolyte on the anode and stacking lithium metal on the solid electrolyte layer.

Comparative Example 1

A half-cell was manufactured in the same manner as in Example 1, with the exception that the anode active material according to Comparative Preparation Example 1 was used.

Test Example 1

Figure 12:
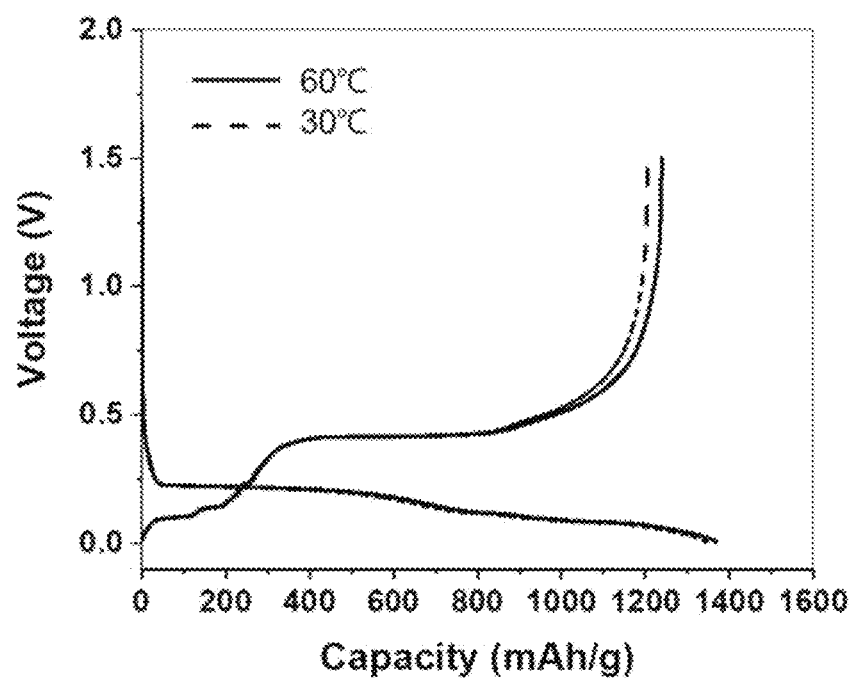
FIG. 12 shows first charge/discharge of a half-cell including the anode according to Example 1.
Figure 13:
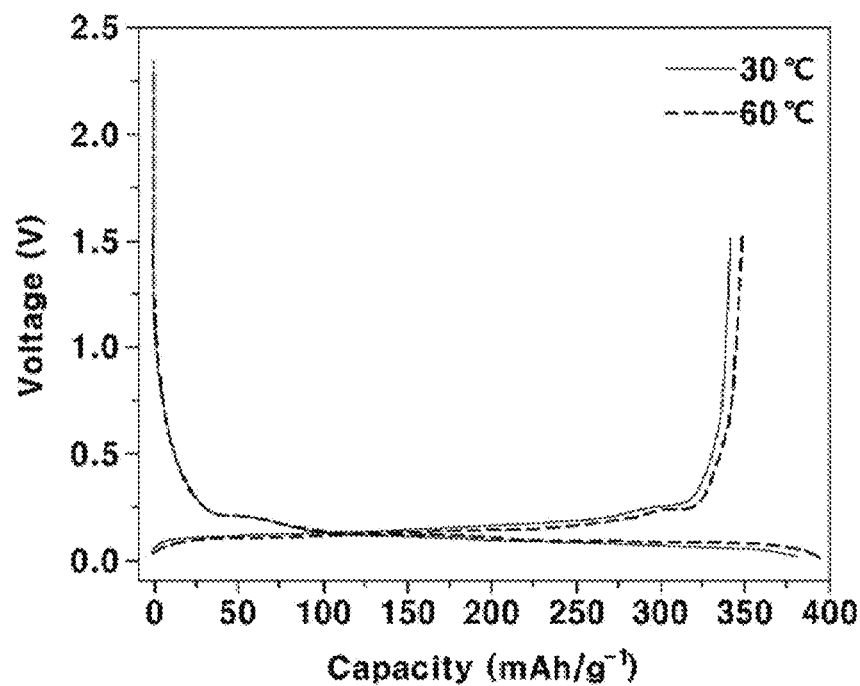
FIG. 13 shows first charge/discharge of a half-cell including an anode according to Comparative Example 1.

FIG. 12 shows first charge/discharge of the half-cell including the anode according to Example 1. FIG. 13 shows first charge/discharge of the half-cell including the anode according to Comparative Example 1. The characteristics thereof were evaluated at a temperature of 30° C. and 60° C.

Comparative Example 1 showed relatively high reactivity in the initial charging reaction (>0.5 V), corresponding to a reaction that forms an irreversible resistive layer, which was not observed in the results of Example 1.

When evaluated at the temperature of 30° C., the initial efficiency of Example 1 was about 91.8%, and the initial efficiency of Comparative Example 1 was about 89.5%. When evaluated at the temperature of 60° C., the initial efficiency of Example 1 was about 90.0%, and the initial efficiency of Comparative Example 1 was about 88.2%.

Test Example 2

Charge/discharge characteristics were evaluated in the same manner as above at a current density increased to 2 mA/cm². The deposition capacity was set to 3.5 mAh/cm².

Figure 14:
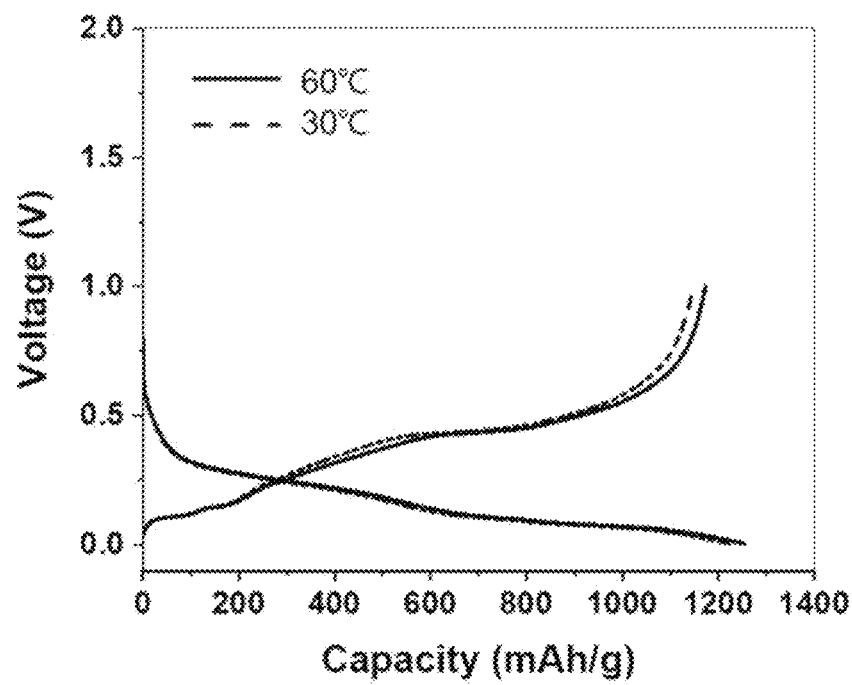
FIG. 14 shows high-rate charge/discharge of the half-cell including the anode according to Example 1.
Figure 15:
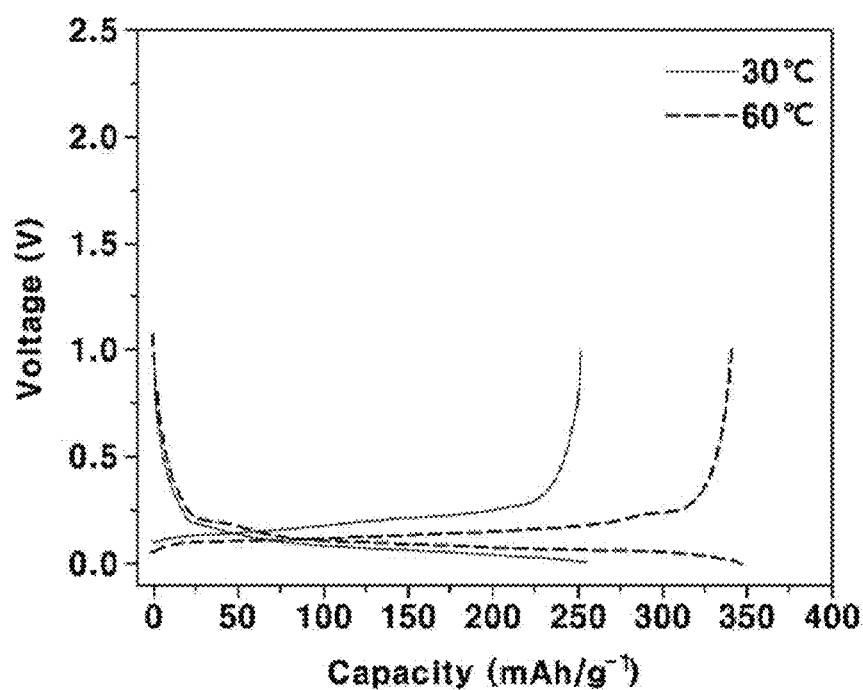
FIG. 15 shows high-rate charge/discharge of the half-cell including the anode according to Comparative Example 1.

FIG. 14 shows high-rate charge/discharge of the half-cell including the anode according to Example 1. FIG. 15 shows high-rate charge/discharge of the half-cell including the anode according to Comparative Example 1. The characteristics thereof were evaluated at a temperature of 30° C. and 60° C.

With reference to FIG. 15, Comparative Example 1 showed a great difference in capacity depending on temperature. At low temperatures at which lithium movement was limited, lithium intercalation was inefficient, which was caused by poor lithium movement between the surface of the particles and the solid electrolyte. Also, the solid electrolyte interphase layer formed at interfaces between the particles and the solid electrolyte may act as resistance and thus may hinder lithium movement.

As shown in FIG. 14, in Example 1, lithium was stored in the anode active material without great variation depending on temperature. This is deemed to be because the first material and the second material contribute to rapid movement of lithium into the anode active material.

Example 2

A full cell was manufactured by stacking a solid electrolyte layer including a sulfide-based solid electrolyte on the anode according to Example 1 and stacking a cathode including a cathode active material, a solid electrolyte, a conductive material, and a binder on the solid electrolyte layer. Nickel-cobalt-manganese oxide was used as the cathode active material.

Comparative Example 2

A full cell was manufactured in the same manner as in Example 2, with the exception that the anode active material according to Comparative Preparation Example 2 was used.

Figure 16:
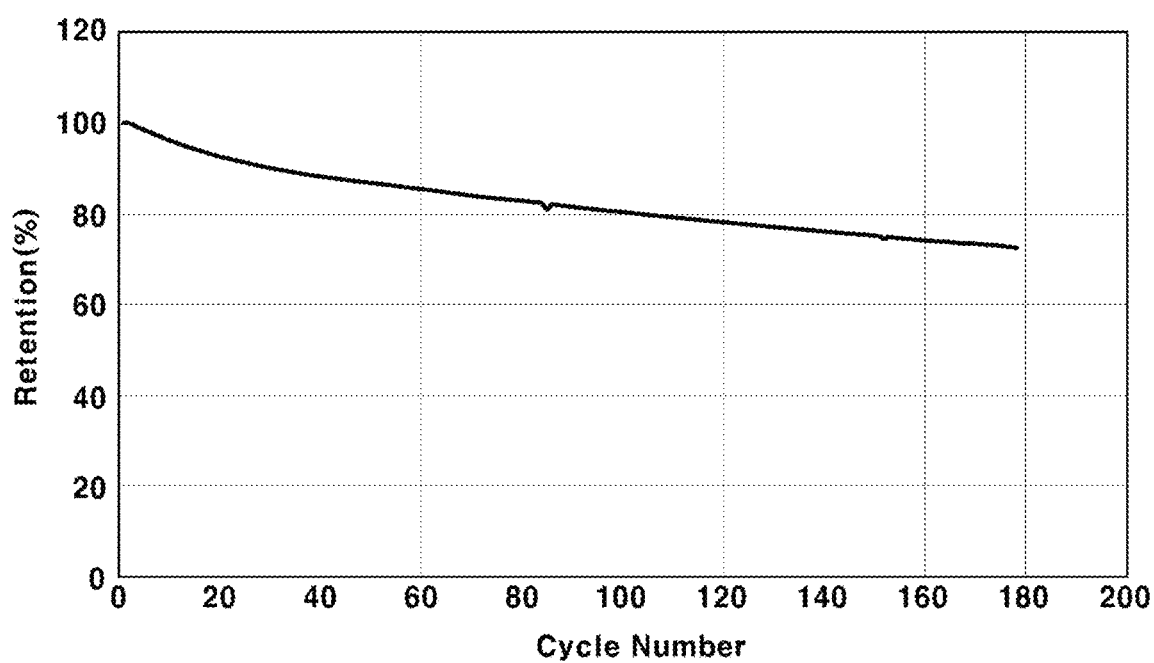
FIG. 16 shows capacity retention of a full cell according to Comparative Example 2.
Figure 17:
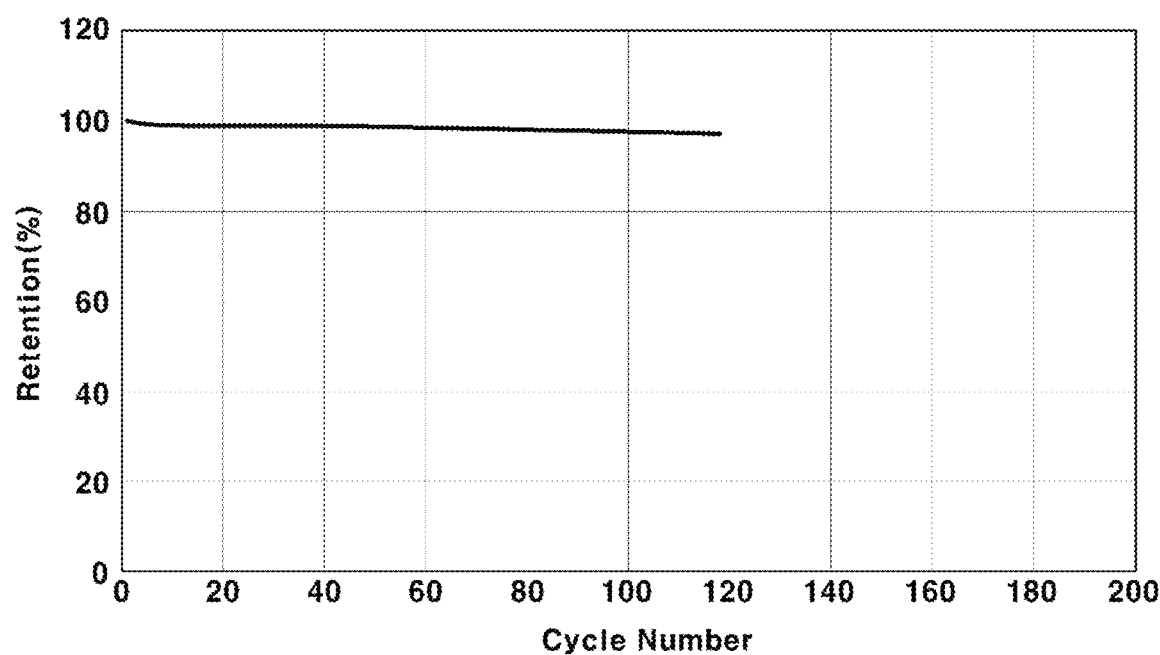
FIG. 17 shows capacity retention of a full cell according to Example 2.

FIG. 16 shows results of measurement of the capacity retention of the full cell of Comparative Example 2. FIG. 17 shows results of measurement of the capacity retention of the full cell of Example 2. As such, Example 2, in which silicon was sufficiently deposited in and on the particles due to large amounts of the first material and the second material, exhibited a very high capacity retention and stable operation compared to Comparative Example 2.

As is apparent from the above description, according to various exemplary embodiments of the present disclosure, an anode for an all-solid-state battery having excellent lithium ion conductivity and storability can be obtained.

According to various exemplary embodiments of the present disclosure, an anode for an all-solid-state battery having excellent energy density and lifespan characteristics can be obtained.

The effects of the present disclosure are not limited to the above-mentioned effects. It should be understood that the effects of the present disclosure include all effects that can be inferred from the description of the present disclosure.

As the exemplary embodiments of the present disclosure have been described in detail above, the scope of the present disclosure is not limited to the above-described embodiments, and various modifications and improvements made by those skilled in the art using the basic concept of the present disclosure defined in the following claims are also within the scope of the present disclosure.

What is claimed is:

1. An all-solid-state battery, comprising:
   an anode active material; and
   a solid electrolyte, and
   wherein the anode active material comprises:
   a particle comprising a plurality of flake carbon fragments overlapped in multiple layers;
   a first material loaded in a space between the plurality of the flake carbon fragments and having lithiophilic property; and
   a second material applied onto at least a portion of a surface of the particle and having lithiophilic property.

2. The all-solid-state battery of claim 1, wherein the particle is formed in a spherical shape, an elliptical shape, or a rod shape.

3. The all-solid-state battery of claim 1, wherein a shortest distance between one flake carbon fragment and the adjacent flake carbon fragment is about 10 nm to 100 nm.

4. The all-solid-state battery of claim 1, wherein the first material occupies about 80% or greater of the space between the plurality of the flake carbon fragments.

5. The all-solid-state battery of claim 1, wherein the first material comprises: one or more selected from the group consisting of silver (Ag), magnesium (Mg), aluminum (Al), gallium (Ga), zinc (Zn), bismuth (Bi), tin ($S_n$), indium (In), antimony (Sb), lead (Pb), silicon (Si), and germanium (Ge), or an alloy thereof with lithium.

6. The all-solid-state battery of claim 1, wherein the first material comprises silicon (Si) or an alloy of silicon (Si) and lithium, and the first material is amorphous.

7. The all-solid-state battery of claim 1, wherein the second material covers about 90% or greater of the surface of the particles.

8. The all-solid-state battery of claim 1, wherein a thickness of the second material is about 20 nm to 1,000 nm.

9. The all-solid-state battery of claim 1, wherein the second material comprises one or more selected from the group consisting of silver (Ag), magnesium (Mg), aluminum (Al), gallium (Ga), zinc (Zn), bismuth (Bi), tin (Sn), indium (In), antimony (Sb), lead (Pb), silicon (Si), and germanium (Ge), or an alloy thereof with lithium.

10. The all-solid-state battery of claim 1, wherein the second material comprises silicon (Si) or an alloy of silicon (Si) and lithium, and the second material is amorphous.

11. The all-solid-state battery of claim 1, wherein an average particle diameter (D50) of the anode active material is about 1 μm to 20 μm.

12. The all-solid-state battery of claim 1, wherein the anode active material comprises an amount of about 40 wt % to 90 wt % of the particles and an amount of about 10 wt % to 60 wt % of a sum of the first material and the second material, the wt % is based on the total weight of the anode active material.

13. The all-solid-state battery of claim 1, wherein a specific surface area of the anode active material is about 0.5 $m^2/g$ to 4 $m^2/g$.

14. An all-solid-state battery, comprising:
    an anode active material; and
    a solid electrolyte, and
    wherein the anode active material comprises:
    a secondary particle comprising a plurality of primary particles overlapped in multiple layers and spheroidized,
    wherein each of the primary particles comprises a flake carbon fragment and a coating part applied onto a surface of the flake carbon fragment and comprising a lithiophilic material.

15. The all-solid-state battery of claim 14, wherein a shortest distance between one flake carbon fragment and the adjacent flake carbon fragment is about 10 nm to 100 nm.

16. The all-solid-state battery of claim 14, wherein the coating part comprises one or more selected from the group consisting of silver (Ag), magnesium (Mg), aluminum (Al), gallium (Ga), zinc (Zn), bismuth (Bi), tin (Sn), indium (In), antimony (Sb), lead (Pb), silicon (Si), and germanium (Ge), or an alloy thereof with lithium.

17. The all-solid-state battery of claim 14, wherein the coating part covers about 90% or greater of the surface of the flake carbon fragment.

18. The all-solid-state battery of claim 14, wherein a thickness of the coating part is about 20 nm to 1,000 nm.

19. The all-solid-state battery of claim 14, wherein the anode active material comprises an amount of about 40 wt % to 90 wt % of the plurality of the flake carbon fragments and an amount of about 10 wt % to 60 wt % of the coating part, the wt % is based on the total weight of the anode active material.

20. The all-solid-state battery of claim 14, wherein a specific surface area of the anode active material is about 0.5 $m^2/g$ to 4 $m^2/g$.

* * * * *